United States Patent [19]

Deshpande et al.

[11] Patent Number: 5,762,829
[45] Date of Patent: Jun. 9, 1998

[54] WET SILICA GELS FOR AEROGEL AND XEROGEL THERMAL INSULATION AND PROCESSES FOR THE WET GELS

[75] Inventors: Ravindra Deshpande, Whitehall; Lisa A. Stover, York, both of Pa.

[73] Assignee: Armstrong World Industries, Inc., Lancaster, Pa.

[21] Appl. No.: 811,633

[22] Filed: Mar. 5, 1997

[51] Int. Cl.$^6$ .................. B01J 13/00; C01B 33/154; C01B 33/16
[52] U.S. Cl. .................. 252/315.6; 252/62; 423/338
[58] Field of Search .................. 252/315.6, 309; 423/338

[56] References Cited

U.S. PATENT DOCUMENTS

| | | | |
|---|---|---|---|
| 2,285,449 | 6/1942 | Marshall | 252/306 |
| 2,927,083 | 3/1960 | Nickerson | 252/315.6 |
| 3,004,921 | 10/1961 | Stossel | 252/309 |
| 3,051,658 | 8/1962 | Power | 252/306 |
| 3,363,979 | 1/1968 | Schwartz et al. | 423/338 |
| 3,652,216 | 3/1972 | Krekeler et al. | 423/338 |
| 3,855,145 | 12/1974 | Vossos | 252/309 |
| 3,947,376 | 3/1976 | Albrecht | 252/309 X |
| 4,216,113 | 8/1980 | Winyall | 252/315.6 |
| 4,339,559 | 7/1982 | McDaniel | 526/106 |
| 4,389,233 | 6/1983 | Kurosaki et al. | 65/31 |
| 5,306,555 | 4/1994 | Ramamurthi et al. | 428/289 |

*Primary Examiner*—Richard D. Lovering

[57] ABSTRACT

A wet silica gel can be prepared by a process comprising the steps of contacting a stable, aqueous, fluid, silica system having a pH greater than 7.5 with an ion exchange resin which removes metal ions and replaces them with H+ ions and thereby reduces the pH to less than 5.0, adding an organic liquid to the aqueous silica system, providing, however, that the organic liquid added stays in one phase with the aqueous, silica, system, and does not cause the silica to precipitate, and adding a base to the silica system so that the pH of the silica system is in the range of from about 5.0 to about 7.5, and allowing the wet silica gel to form. The wet silica gel formed by this process is characterized by its high organic solvent content and the low concentration of basic metal ions.

27 Claims, No Drawings

WET SILICA GELS FOR AEROGEL AND XEROGEL THERMAL INSULATION AND PROCESSES FOR THE WET GELS

BACKGROUND OF THE INVENTION

1. Field of the Invention

Silica aerogels and highly porous xerogels are effective thermal insulation. Unfortunately the preparation of these materials is both time consuming and costly. The preparation of wet silica gels which can be effectively dried either supercritically or under atmospheric pressure has both time consuming and expensive steps. For example, washing the necessary amount of water out of the gel to prepare for drying makes the procedure both time consuming and expensive. As a result of such problems, silica aerogels and xerogels have not yet reached full commercial effectiveness.

It would be beneficial to have a process that would decrease the amount of time needed for the preparation of a wet silica gel which can be dried either supercritically or under atmospheric pressure. It is an object of the present invention to provide such a process. Specifically, it is an object of the present invention to provide a process for a wet gel having a high organic solvent content thereby, making it easier and faster to eliminate the water that is detrimental to the gel drying process. It is another object to furthermore, make this gel with an inexpensive silica source. It is a further object of the present invention to have a wet gel preparation method that would allow the production of aerogels and xerogels having a finer pore structure. Other objects and advantages of the present invention will become apparent from the description that follows.

SUMMARY OF THE INVENTION

A wet silica gel can be prepared by a process comprising the steps of contacting a stable, aqueous, fluid, silica system having a pH greater than 7.5 with an ion exchange resin which removes metal ions and replaces them with H+ ions and thereby reduces the pH to less than 5.0, adding an organic liquid to the aqueous silica system, providing, however, that the organic liquid added stays in one phase with the aqueous, silica, system, and does not cause the silica to precipitate, and adding a base to the silica system so that the pH of the silica system is in the range of from about 5.0 to about 7.5, and allowing the wet silica gel to form.

The wet silica gel formed by this process is characterized by its high organic solvent content and the low concentration of basic metal ions. Advantageously, this wet gel is obtained rapidly and cheaply by using the ion exchange resin followed by the addition of the organic solvent and base. It has further been noted that when this wet silica gel product is washed with an organic solvent to remove water and then dried to obtain either a xerogel or aerogel product, this dried product is further remarkable in that it has a very fine pore structure.

DETAILED DESCRIPTION

The starting material to prepare the wet gels of the present invention (the aqueous, fluid, silica system) can either be obtained commercially or can be prepared by combining a soluble silicate (preferably sodium silicate) in water. The starting materials include colloidal silica and any aqueous silicate salt. If desired a mixture of colloidal silica and the aqueous silicate salt can be prepared.

When the aqueous, fluid silica system is obtained commercially the solids percent of the aqueous silicate is generally in the range of from about 40 to about 45% and sometimes even at 50%. When conducting the process of the instant invention with such materials, it is preferred to decrease the percent solids of the starting material by adding water before the fluid silica system is contacted with the ion exchange resin. Thus it is preferred to decrease the solids to less than about 45%.

The preferred percent solids of the starting aqueous silicate system of the present invention is in the range of from about 4 to about 20%. Most preferably the percent solids is from about 4 to about 13%. Having the percent solids in this preferred range helps to avoid premature gelling of the fluid silica system when it is contacted with the ion exchange resin. Thus, if necessary in the process it is preferred to add a sufficient amount of water to put the percent solids of the aqueous, fluid silica system in the range of from about 4 to about 20%.

Another step which can be used to prevent premature gelling of the aqueous, fluid, silica system is to cool either the aqueous silica system, or the ion exchange resin, or both. Keeping either the silica or the resin or both at a cooler-than-ambient temperature will help to maintain the fluid, non-gelled nature of the silica while doing the ion exchange. Preferably the temperature is maintained in a range of from about 4 to about 22° C.

The aqueous, fluid, silica starting material has a pH above 7.5, preferably the pH of the starting material will in fact be about 10 or more. This aqueous, fluid, silica is contacted with an ion exchange resin which takes the metal ions out of the silica. These metal ions are what gives the silica system its high pH. During the ion exchange, the metal ions are replaced with H+ions which reduces the pH of the aqueous silica. After the ion exchange has been completed, the pH of the silica system will be too low to gel rapidly at room temperature. The finishing pH will be less than 5, and preferably it will be about 3.5 or less.

The ion exchange resin can either be prepared by known techniques or can be obtained commercially. A suitable ion exchange resin is a polystyrenesulfonic based acid such as Amberlite from Rohm and Haas. Also suitable is polyacrylic acid and polysulfonic acid.

After the ion exchange an organic liquid is added to the aqueous silicate which, at that point, has a pH below 5. Alternatively the base and organic solvent can be added simultaneously.

After adding the organic liquid the silicate composition suitably can have an organic solvent content in the range of from about 20 to about 80% by wt. (weight). Preferably the organic solvent content in the silicate system will be in the range of from about 40 to about 60% by wt.

The organic liquid added to the aqueous silicate gel can be selected from any organic solvent which stays in one phase with the aqueous, silica, system and which also does not cause the silica to precipitate. Suitably the organic liquid is made up of solvents selected from the group consisting of alcohol, acetone, 1:4 dioxane, tetrahydrofuran, acetonitrile and ethylene glycol. Preferably the organic liquid includes an organic solvent selected from the group consisting of alcohol and acetone. Most preferably the organic liquid includes a solvent selected from the group consisting of ethanol, methanol, propanol, isopropanol, butanol and acetone.

The base is added to cause gelling of the system. Any base can be used. A preferred base is ammonium hydroxide.

The present invention may be better understood from the examples which follow. All parts and percentages are by weight unless otherwise indicated.

EXAMPLES

Example 1

One part by weight of sodium silicate solution (waterglass from PQ Corp.) was diluted by mixing it with three parts by weight of deionized water to produce a solution which was 10 percent by weight solids. A polystyrenesulfonic acid cation exchange resin filled an ion exchange column. Twelve (12) lbs. of the diluted sodium silicate solution was pumped through the ion exchange column at the rate of 1 liter/minute flow rate. The ion exchange process continued till the pH of the exit stream reached 2.5. One part of ethanol was mixed with two parts of deionized silicate solution. Ammonium hydroxide was then added to put the pH of the solution in the range of from 6.5 to 7. The organosol was then set aside and gellation occurred in an hour at room temperature.

The gel was washed with ethanol and dried under supercritical conditions with ethanol. The resulting aerogel had 0.09 g/cc density and a surface area of about 850 square meters/gram.

Example 2

Deionized water was added to a sodium silicate solution which was 40% solids to obtain a 12% solids solution. This solution was passed through a cation exchange column containing a polystyrenesulfonic acid resin to replace the sodium ions with H+ ions. This ion exchange step continued until the DH of the solution reached 3.0.

The resulting ion exchanged solution was divided into five samples of 20 g each. Acetone was added to these five samples in amounts of 5, 10, 15, 20, and 30 grams respectively. No precipitation was observed. Ammonium hydroxide was then added to put the pH near 7. The samples were then permitted to gel. The samples in which there was less acetone gelled faster.

Example 3

A deionized silica sol was prepared by adding water to sodium silicate and passing it through an ion exchange column. Ethanol was added to the deionized silica sol to produce a sol that was 40% by weight ethanol. The sol was gelled by adding ammonium hydroxide to change the pH to 7 and letting the sol sit. After gellation the gel was washed with ethanol and then was supercritically dried. The resulting aerogel was 0.14 g/cc bulk density and a surface area of 781 square meters/gram.

Example 4

A solution of sodium silicate which was 14% by weight sodium silicate was prepared by diluting a commercially available solution. This diluted sodium silicate solution was cooled to 4° C. The ion exchange column was insulated and the chilled solution was passed through it to replace metal ions with H+ ions thereby reducing the pH to near 2. In spite of chilling premature gelling was noted in the column. Thus, it is preferred to have the percent solids of the silica sol be a maximum of about 12%.

Example 5

A sodium silicate solution that was 11% solids was prepared. To 20 g of this solution 10 g of a polystyrenesulfonic acid cation exchange resin was added and the mixture was rapidly stirred. Stirring continued till the pH of the mixture reached 2.5. The ion exchange resin was removed by filtration. An equal amount of ethanol was added to the deionized sol. Gellation was achieved by increasing the pH to 7 with ammonium hydroxide.

We claim:

1. A process for the preparation of a wet silica gel comprising the steps of:
   (a) contacting a stable, aqueous, fluid, silica system having a pH greater than 7.5 with an ion exchange resin which removes metal ions and replaces them with H+ ions and thereby reduces the pH to less than 5.0;
   (b) adding an organic liquid to the aqueous silica system, wherein the organic liquid is characterized in that it stays in one phase with the aqueous silica system, and does not cause the silica to precipitate;
   (c) adding a base to the silica system so that the pH of the silica system is in the range of from about 5.0 to about 7.5; and
   (d) allowing a wet silica gel to form.

2. The process of claim 1 wherein, after the organic liquid is added, the system has an organic solvent content in the range of from about 20 to about 80%.

3. The process of claim 1 wherein the ion exchange resin is cooled.

4. The process of claim 1 wherein the aqueous, fluid, silica system which contacts the ion exchange resin is cooled.

5. The process of claim 1 wherein both the ion exchange resin and the aqueous, fluid, silica system which contacts the ion exchange resin are cooled.

6. The process of claim 5 wherein both the ion exchange resin and the aqueous, fluid, silica system are at a temperature in the range of from about 4° to about 22° C.

7. The process of claim 1 wherein the ion exchange resin is a polysulfonic based acid.

8. The process of claim 1 wherein the aqueous, fluid, silica system has a percent solids level in the range of from about 4 to about 13%.

9. The process of claim 1 wherein the aqueous, fluid, silica system is a colloidal silica.

10. The process of claim 1 wherein the aqueous, fluid, silica system is a silicate salt.

11. The process of claim 10, wherein the silicate salt is sodium silicate.

12. The process of claim 1 wherein the organic liquid includes an organic solvent selected from the group consisting of an alcohol and acetone.

13. The process of claim 12 wherein the solvent is acetone.

14. A silica gel having a dry bulk density of from about 0.09 g/cc to about 0.14 g/cc which was prepared by the process comprising the steps of:
   (a) contacting a stable, aqueous, fluid, silica system having a pH greater than 7.5 with an ion exchange resin which removes metal ions and replaces them with H+ ions and thereby reduces the pH to less than 5.0;
   (b) adding an organic liquid to the aqueous silica system, wherein the organic liquid is characterized in that it stays in one phase with the aqueous silica system, and does not cause the silica to precipitate;
   (c) adding a base to the silica system so that the pH of the silica system is in the range of from about 5.0 to about 7.5; and
   (d) allowing a wet silica gel to form.

15. The gel of claim 14 wherein, after the organic liquid is added, the system has an organic solvent content in the range of from about 20 to about 80%.

16. The gel of claim 14 wherein both the ion exchange resin and the aqueous, fluid, silica system are at a temperature in the range of from about 4° to about 22° C.

17. The gel of claim 14 wherein the ion exchange resin is a polysulfonic based acid.

18. The gel of claim 14 wherein the aqueous, fluid, silica system has a percent solids level in the range of from about 4 to about 13%.

19. The gel of claim 18 wherein the wet silica gel is then dried.

20. The gel of claim 14 wherein the aqueous, fluid, silica system is a colloidal silica.

21. The gel of claim 20 wherein the wet silica gel is then dried.

22. The gel of claim 14 wherein the aqueous, fluid, silica system is a silicate salt.

23. The gel of claim 22, wherein the silicate salt is sodium silicate.

24. The gel of claim 14 wherein the organic liquid includes an organic solvent selected from the group consisting of an alcohol and acetone.

25. The gel of claim 24 wherein the solvent is acetone.

26. The gel of claim 24 wherein the wet silica gel is then dried.

27. The gel of claim 14 wherein the wet silica gel is then dried.

* * * * *